April 2, 1935. F. PUENING 1,996,650
APPARATUS FOR DISTILLING COAL OR OTHER CARBONACEOUS MATERIAL
Filed May 1, 1930 8 Sheets-Sheet 1
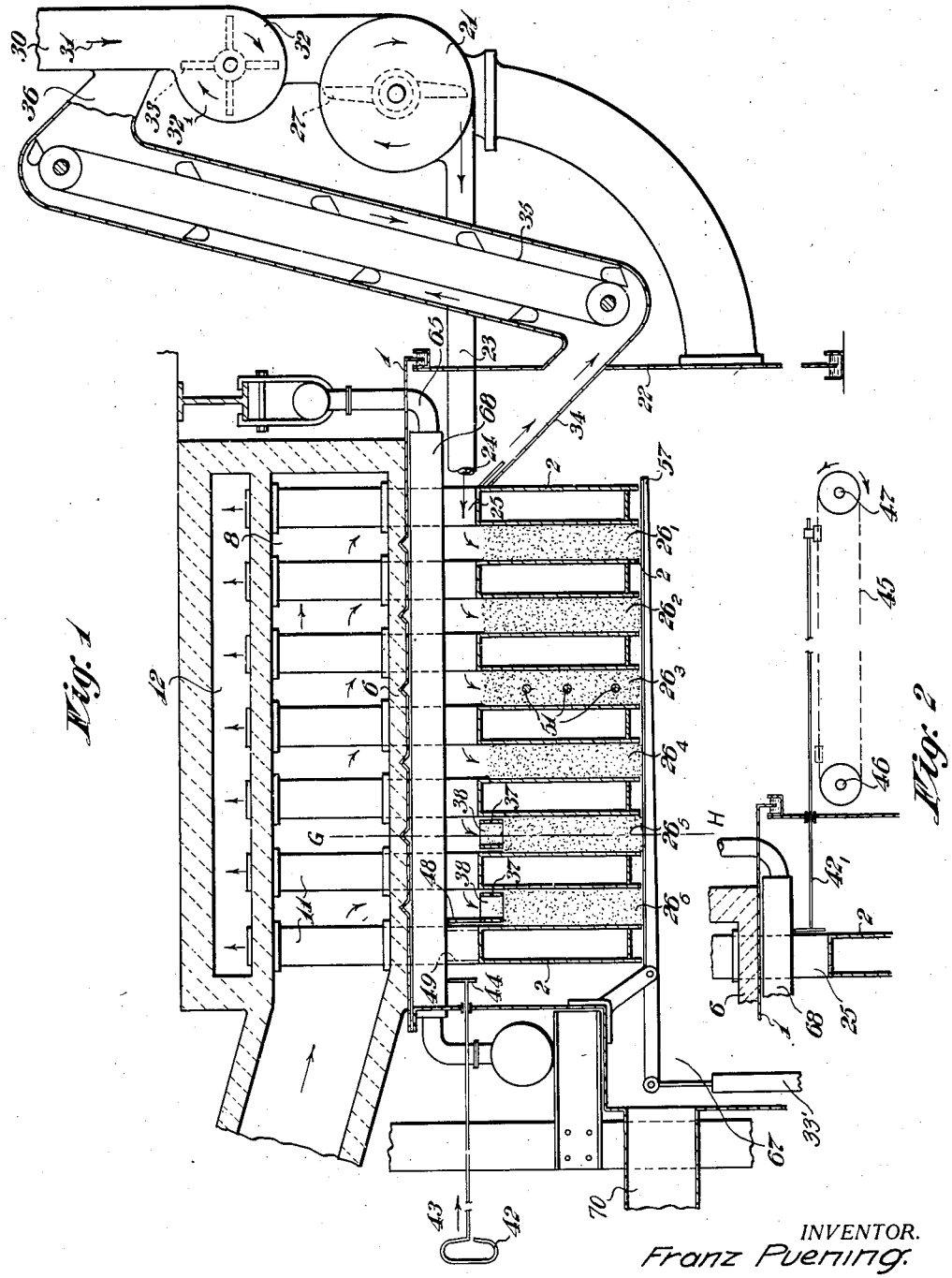
INVENTOR.
Franz Puening.
BY Jesse P. Langley
ATTORNEY.

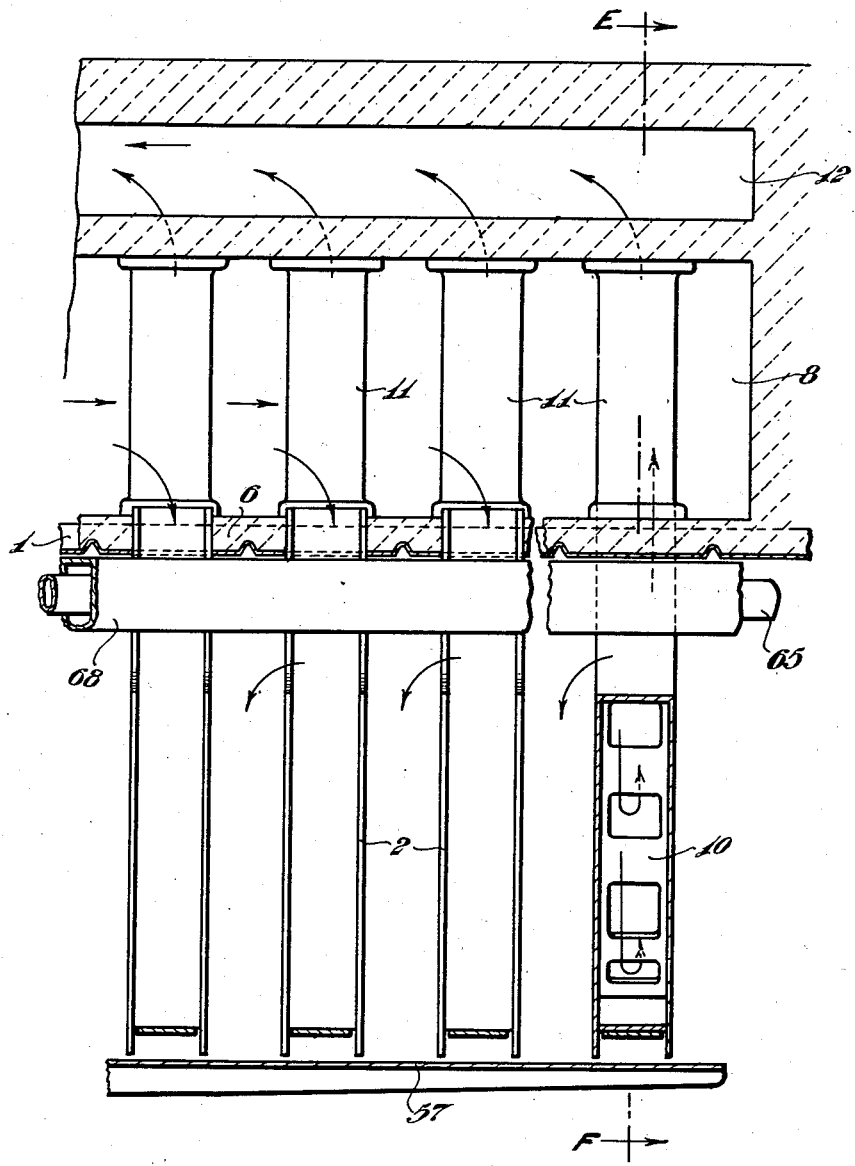

April 2, 1935. F. PUENING 1,996,650
APPARATUS FOR DISTILLING COAL OR OTHER CARBONACEOUS MATERIAL
Filed May 1, 1930 8 Sheets-Sheet 4

INVENTOR.
Franz Puening.
BY Jesse R. Langley
ATTORNEY.

April 2, 1935. F. PUENING 1,996,650
APPARATUS FOR DISTILLING COAL OR OTHER CARBONACEOUS MATERIAL
Filed May 1, 1930 8 Sheets-Sheet 6

INVENTOR.
Franz Puening
BY Jesse R. Langley
ATTORNEY.

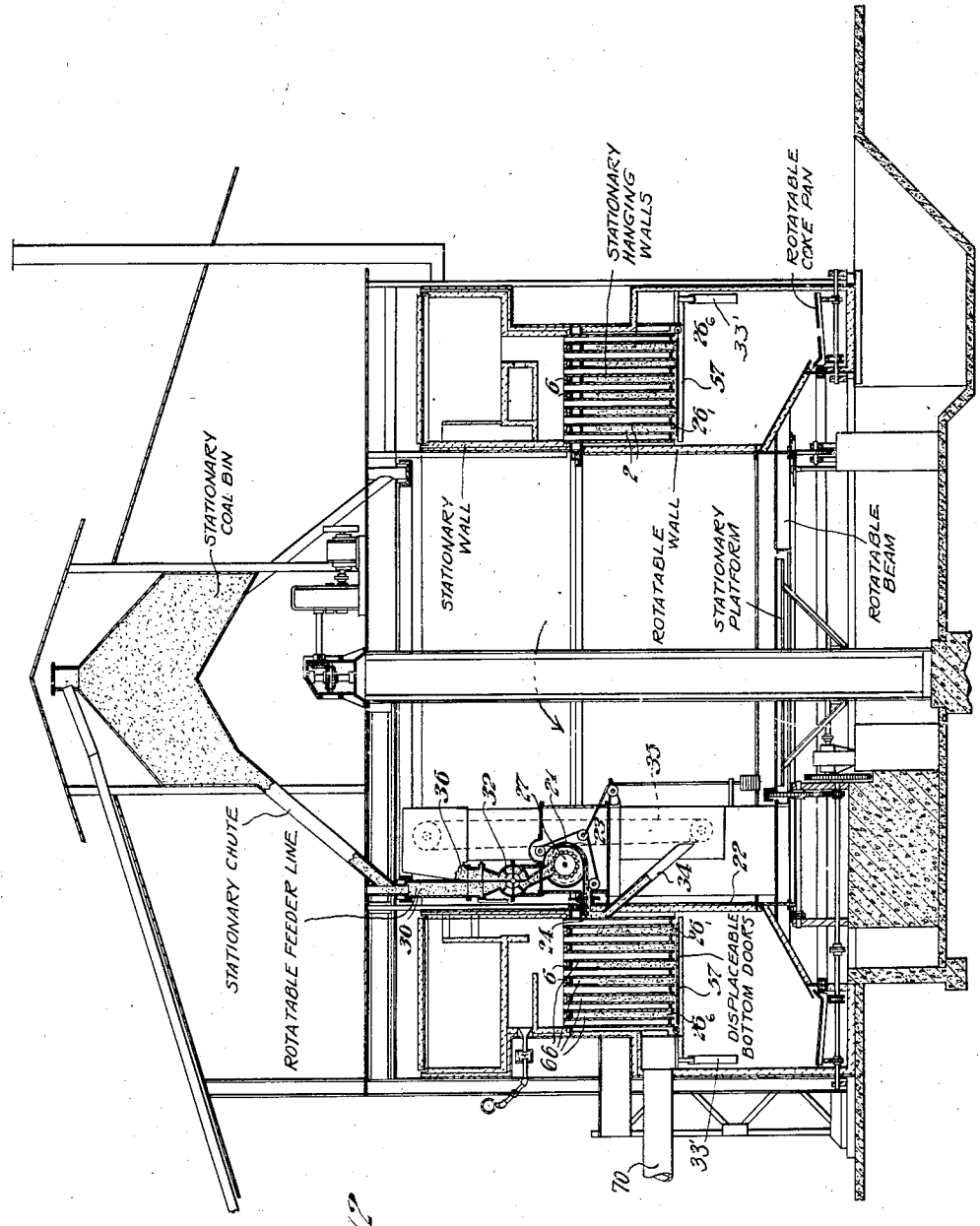

April 2, 1935. F. PUENING 1,996,650
APPARATUS FOR DISTILLING COAL OR OTHER CARBONACEOUS MATERIAL
Filed May 1, 1930 8 Sheets-Sheet 8

Inventor
Franz Puening.
By
Jesse R. Langley
Attorney

Patented Apr. 2, 1935

1,996,650

UNITED STATES PATENT OFFICE 1,996,650

APPARATUS FOR DISTILLING COAL OR OTHER CARBONACEOUS MATERIAL

Franz Puening, O'Hara Township, Allegheny County, Pa.

Application May 1, 1930, Serial No. 448,901
In Germany April 30, 1929

10 Claims. (Cl. 202—113)

The invention relates to the distillation of coal or other carbonaceous material and is closely related to and an improvement upon the invention described in my application Serial No. 279,725, filed May 22, 1928.

In accordance with the present invention, an annular head plate for carrying suspended wall members is provided with folds or pleats, which are arranged radially over the entire width of the head plate. The suspended wall elements can be welded into the head plate and can be arranged in such manner that the openings for the heating gases are disposed along radial lines.

The radial folds or pleats in the head plate are between the radially arranged rows of openings for the entrance and the exit of the heating gases. In small installations, the head plate may be made of one piece.

However, in large installations with large suspended elements, it is desirable to divide the head plate along radial lines into separate pieces of convenient size so that only one group of radially disposed elements is welded into each piece of the head plate. The radial edges of the different pieces of the head plate are then flanged and are riveted or welded together, providing at the same time a radial fold or pleat for expansion.

Since the suspended elements are expanding in radial direction also, there are arranged between those elements tangentially extending folds or pleats, which cross and cut the radial ones. In this manner, a head plate is created, which guarantees the necessary flexibility for expansion and which, at the same time, serves as a unitary (welded) separating plate between the distilling chamber and heating gas ducts.

This head plate is supported by cooled beams, located underneath, and the heating gas ducts are disposed on top of the plate. The separation between these ducts and the distilling chamber is, therefore, absolute and complete. The plates or the different parts of the plates can be formed either with the aid of presses and may be of a single piece of material or a number of pieces may be welded together.

In case one of the suspended elements becomes defective, it can be cut out and a new element can be welded in, or an entire group of the radial elements including the corresponding part of the head plate may be removed and a new group with its part of the head plate may be inserted by welding.

According to my invention, the individual sections of the suspended elements are anchored to each other at two or more points, thereby making it impossible for them to get out of their ring-shaped alinement. For this reason, certain locking pieces are inserted between sections from below, locking the sections at a point about midway of their height. At the lower end, the sections are connected to each other by other horizontal locking devices, by means of which the gap between sections is bridged. All these locking means are so shaped and arranged that the expansion of the elements against each other in tangential direction is not interfered with.

Instead of arranging short locking pieces at the bottom of the elements, a single circular steel bar can be fastened to the lower part of each circular wall of elements. Each element may be fastened to the ring-shaped bar at its center only, in order to allow for expansion in both directions from the center of the element. This connection between a bar and an element at the center of the latter may not be necessary and the ring-shaped bar may be held in a manner which will not allow a relative sliding between the ring-bar and the elements.

Coal is thrown into the chambers from the side, viz, from the inside of the ring-shaped coking machine. For this reason, all ring-shaped suspended walls are provided with large filling openings for the coal, these openings being arranged along radial lines in alinement so that the coal can be thrown through all openings and into the farthest chamber. The coal is also in this case thrown into the chambers by a throwing machine of known construction with rotating throwing arms or the like, similar to the machines as used in gas works for the filling of horizontal retorts.

This throwing machine is mounted on the rotating inner part of the shell of the coking machine and rotates with it. The throwing machine is designed as a separate unit and is mounted in such manner that it can be easily inspected and replaced if necessary. The mouth-piece of the throwing machine during the movement through its circular path will not always be just in front of a filling opening.

To avoid excessive spilling of coal against the inner heating wall when the mouth-piece is not exactly in front of the radial filling opening, an arrangement is provided which shuts off the coal supply to the throwing machine at regular intervals. To attain this end, there is installed above the throwing machine a rotating coal feeder or the like. This feeder will be rotated automatically from time to time, and it feeds coal only at such times while the mouth-piece of the throwing machine is facing one of the filling openings and gradually passes it.

The valve is at rest when the mouth-piece of the throwing machine has moved beyond the reach of a filling opening and is opposite the solid heating wall between two filling openings. It appears to be practical to keep the throwing machine always in motion, because shutting down and starting of such a high-speed machine would be uneconomical. The periodical operation of the rotating coal feeder is best accomplished by a motor, the starting and stopping of which is effected electrically, for instance by means of a clockwork in a known manner. This controlling device acts in agreement with the circumferential speed of the rotating parts of the machine.

In order to be certain that all coking chambers are filled to the desired height, such an amount of coal is thrown in that all filling openings in the different walls, which are located in radial alinement, are filled with coal to such extent that the coal overflows the first filling opening in the innermost wall, from where it is then returned to the throwing machine by means of a bucket conveyor.

The excess coal in the filling openings must be prevented from being coked and for this reason steps must be taken to remove this surplus coal without delay. This is done best automatically when the rotation of the throwing machine has reached a position when delivery of coal is interrupted due to the stopping of the coal feeder. To accomplish this purpose, limiting bars are used.

These limiting bars are mounted on a platform located below the heating walls and rotating with the inner shell, as well as with the coke plows and the coal-throwing machine. They reach into the highest part of the chambers and extend below the filling openings. The coal, which is thrown in, covers the bars. The bars are of a certain thickness and displace a certain volume of coal. To enable the thrown-in coal to fall into the spaces below the limiting bars, perforations are provided in the bars, through which the coal may pass. The perforations in the limiting bars register in radial direction with the throwing machine and their mouth-piece.

By withdrawing the coal covered bars, which is effected by the rotation of the rotating part of the machine, a void is created in the upper part of the chamber and into this void the coal drops, freeing the filling openings of coal. In addition, the limiting bars are provided with small scraping plates which, moving through the top part of the chambers, insure that surplus coal is moved forward and in the direction of rotation. In this manner, a ring-shaped hollow space above the coal is securely maintained in all of the chambers.

The distillate gases escape into this space and pass into the filling openings and out of the machine into the condenser.

Notwithstanding these precautions, it will be unavoidable that small quantities of coal remain in the lower part of the filling openings. They can be pushed out by means of radially arranged scrapers. Such scrapers can be arranged on the stationary outside shell and they can be operated by hand and be pushed through the filling openings. Preferably only one scraper may be used, which rotates with the inside rotating shell. The scraper will, when just being opposite one of the filling openings, quickly be pushed in and pulled out again.

There will be sufficient time for making this movement. It can be assumed that the coking time, even with a thin layer of coal, will be between one and two hours. Assuming ninety minutes coking time and therefore one revolution of the machine in ninety minutes, a diameter of the machine of thirty feet (measured at the inside heating wall), also a diameter of the filling opening of 8″ and a diameter of the scraper of 4″, then the time for pushing the scraper in and withdrawing it will be nineteen seconds. Within this time, the scraper can be moved to and fro.

Preferably the scraper will be operated in the same manner as the coal leveler on coke ovens. A wire rope or a chain is wound around two sheaves and the end of the scraper bar is connected to the straight part of the wire rope or chain. An electric drive causes one of the sheaves to rotate first in one direction and then in the other.

An electrically or a mechanically controlled device is provided which, at the proper moment, starts and stops the motor driving the sheaves. The starting of the device must occur at the moment when the scraper is in front of a filling opening. It is, therefore, necessary for the controlling device to work in synchronism with the rotating part of the coking machine.

The drawings illustrate an embodiment of my invention in which

Figure 1 is a radial vertical section through a portion of the machine of my invention, certain details being omitted in the interest of clearness;

Fig. 2 represents in part a device for cleaning the filling openings;

Fig. 3 is an illustration of a portion of Fig. 1 in enlarged section on lines A—B and C—D of Fig. 4;

Fig. 12 is a view in vertical section of the complete apparatus of my invention; and Fig. 13 is a view, partly in vertical cross-section, of the apparatus of my invention, illustrating the movement of the coal throwing machine, leveler bars, tampers, etc. as a unit relative to the heating walls and coking chambers.

Figure 5:
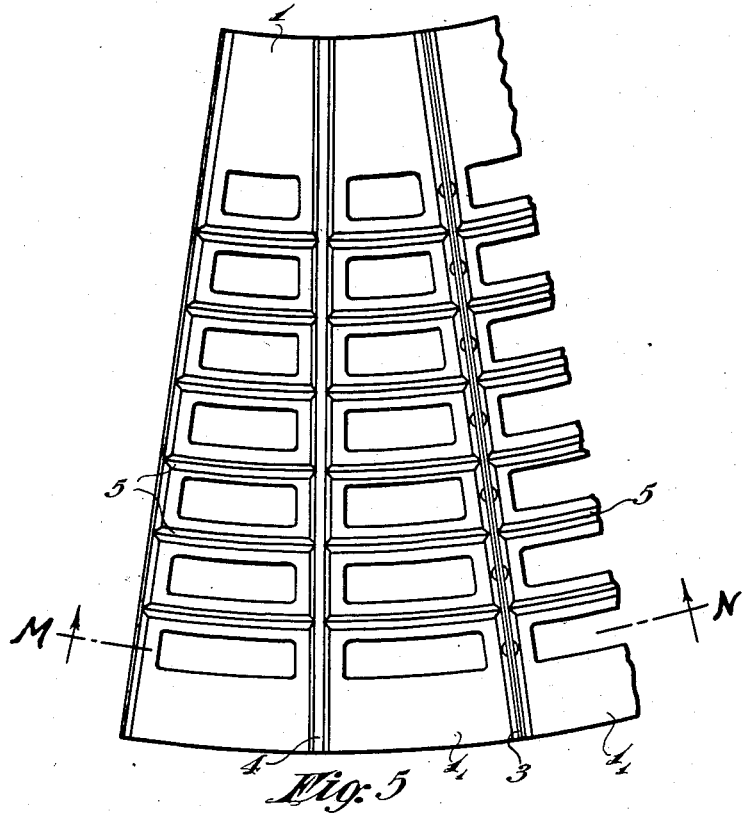
Fig. 5 is a plan view of a portion of the apparatus of Fig. 1.

An annular head plate 1, from which walls or wall elements 2 are suspended consists of a plurality of segments or ring sectors $l_1$, Fig. 5. The edges of these ring-sectors are bent over to form flanges 3 in such a manner that two adjacent parts $l_1$ of the head plate can be connected together by riveting and/or welding. But the flanges are not formed in the common manner by flanging at a right angle, and an obtuse angled flange is desired, slanting slightly inwards, to make possible a certain expansion of the parts $l_1$ against each other or away from each other.

Figure 6:
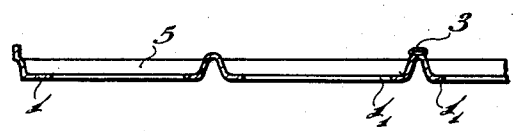
Fig. 6 is a section through the head plate on the circular line M—N of Fig. 5.

To provide for an expansion of the parts $1_1$ between their flanges, folds or pleates 4 are arranged, as are illustrated in Fig. 6. These folds can also be formed in the shape of a lyre. Besides these folds, which may be characterized as radial folds 5, there are also tangential folds or pleats provided, which run along circular lines. By these means, a gas-tight, unitary head plate is created, which is also elastic in itself.

This head plate 1, which consists of rolled steel plate or the like of appropriate thickness, rests on water-cooled beams 65 and carries in turn the inlet and outlet ducts for the heating gases. These beams 65 are insulated by a protecting pipe 68 against heat absorption. Immediately above the head plate rests a layer 6 of fire-brick or insulating material.

Figure 4:
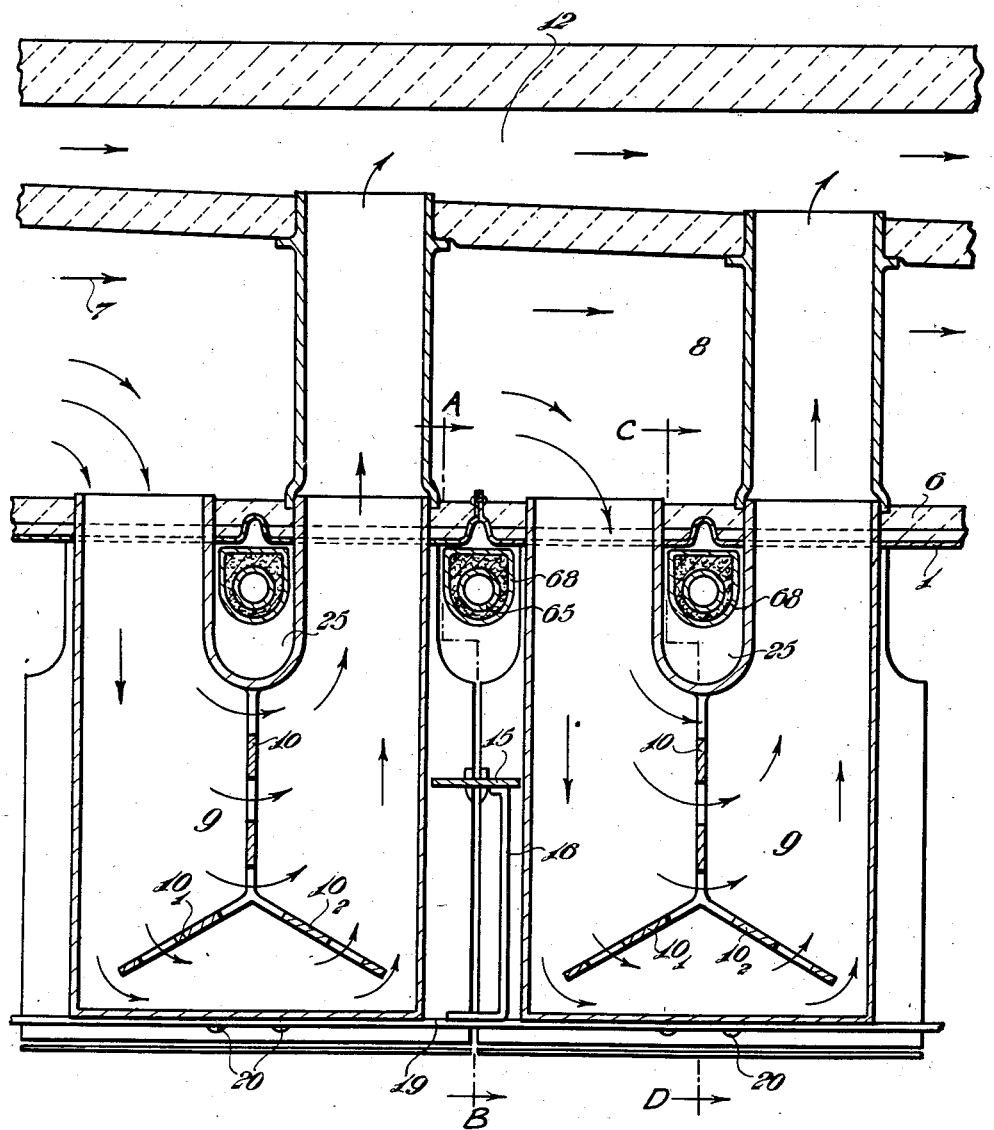
Fig. 4 is a section on line E—F of Fig. 3.

The travel of the heating gases is shown in Fig. 4. The heating gas flows in the direction of the arrow 7 into inlet duct 8, and vertically down into the retort 9 in the lower part of which it is being reversed by guide plates 10. These guide plates are shaped in the form of a star, i. e., besides the center rib 10 there are two side arms $10_1$ and $10_2$, directing the gases into the lower corners.

The waste gases rise vertically into a tube 11, which intersects inlet duct $8_1$ and from there they reach outlet duct 12. Fig. 4 illustrates that the heating gas inlet duct gradually decreases in section and that in turn the outlet duct increases in section. This is accomplished in a simple manner by slanting the separating wall between the two ducts. This not only allows a favorable utilization of space but also causes the heating gases to flow at a uniform speed.

Figure 8:
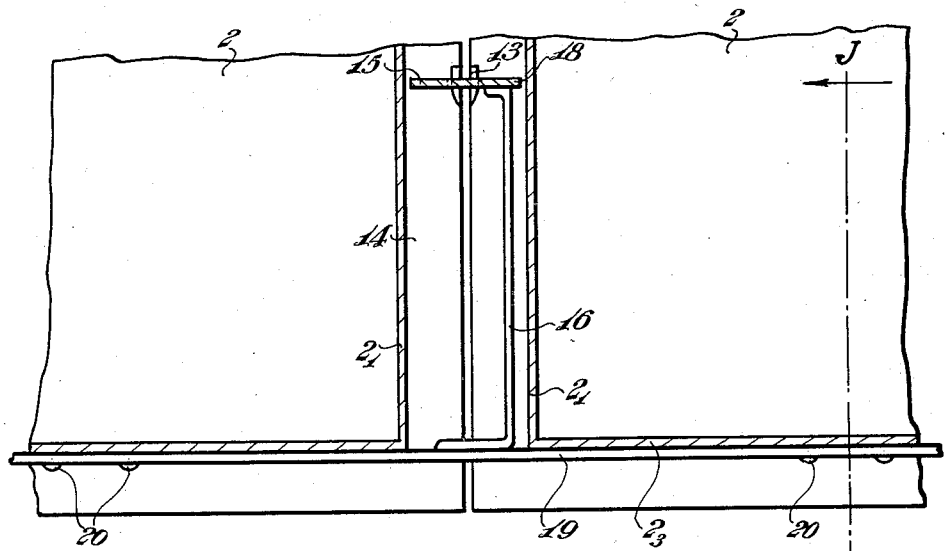
Fig. 8 is an enlarged view illustrating the interlocking of the heating elements of Fig. 4.

To avoid misalinement of a wall element, the interlocking pieces are anchored at about midway of the height of the wall elements. This anchorage is illustrated in Fig. 4 and also in Figs. 8 and 9.

Figure 9:
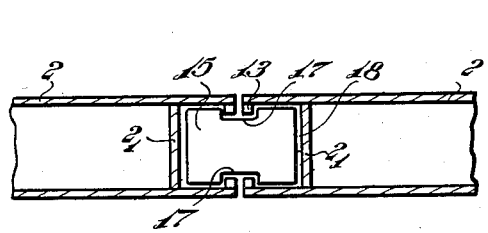
Fig. 9 is a view in horizontal section of the apparatus of Fig. 8.
Figure 10:
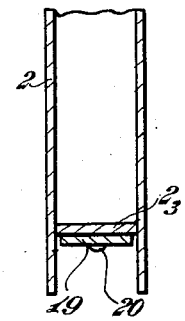
Fig. 10 is a vertical section on line J—K of Fig. 8.
Figure 11:
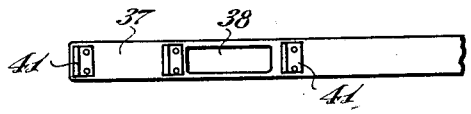
Fig. 11 is a plan view of a portion of the limiting bar, Fig. 7.
Figure 15:
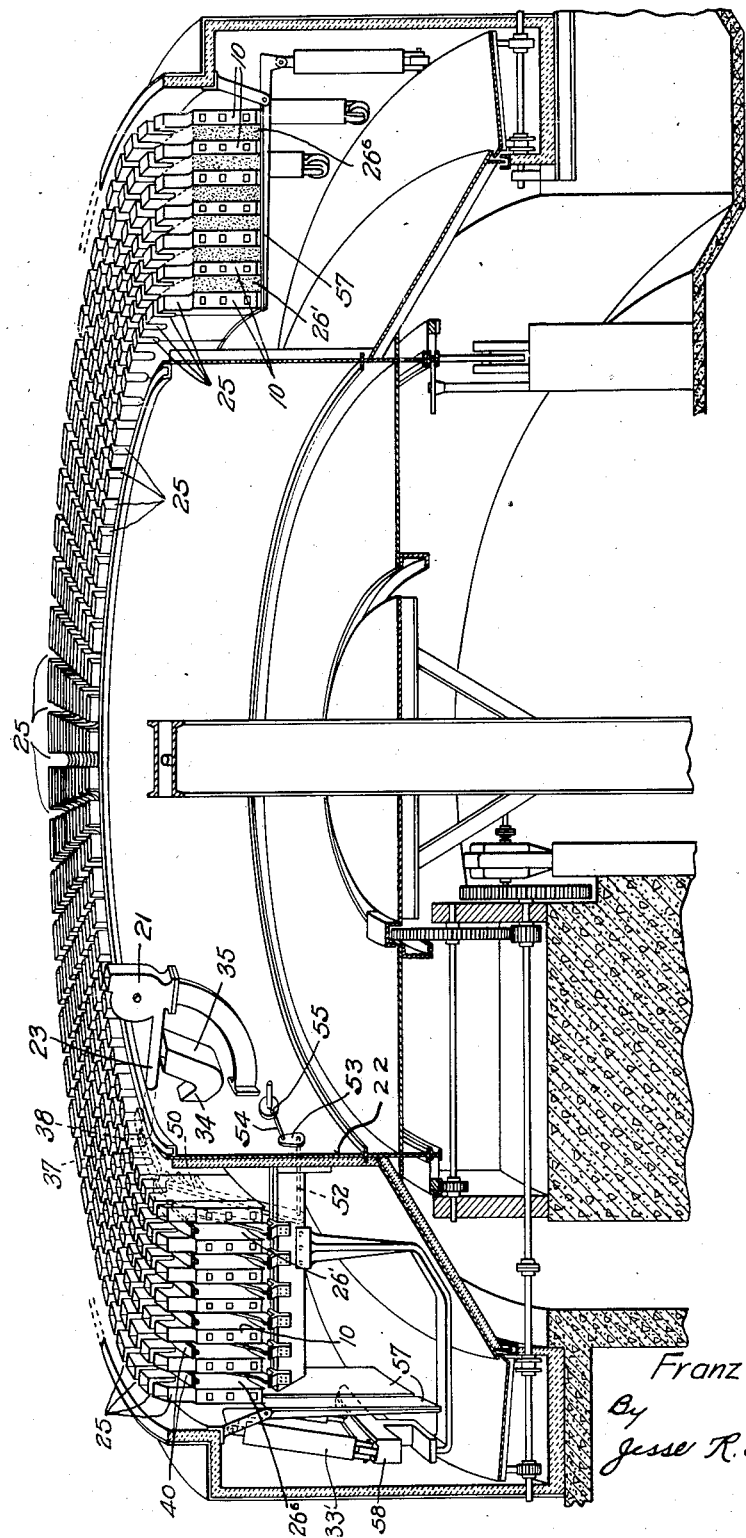

At their free ends and about midway of the elements 2, the latter are provided with locking projection 13, as shown in Fig. 9. Corresponding with the above-mentioned projections, a locking plate 15 is inserted in space 14 between two elements 2. This plate 15, which is provided with notches 17 corresponding to projections 13 of the wall elements, is supported by a leg 16. The locking plate 15 is inserted with a slight clearance between wall elements 2, and especially a clearance 18 from cross-walls $2_1$ of the elements 2.

At the bottom, the wall elements are also held in line by a ring-shaped rail 19 serving as a locking or distance plate $1_1$. This rail is always connected at the center of the element with the bottom wall $2_3$ of the latter by rivets 20 and bridges the space between two elements. This guarantees sufficient possibility of expansion of the elements and at the same time it renders relative movements of the wall elements impossible and, therefore, the spaces provided are practically constant.

Figure 7:
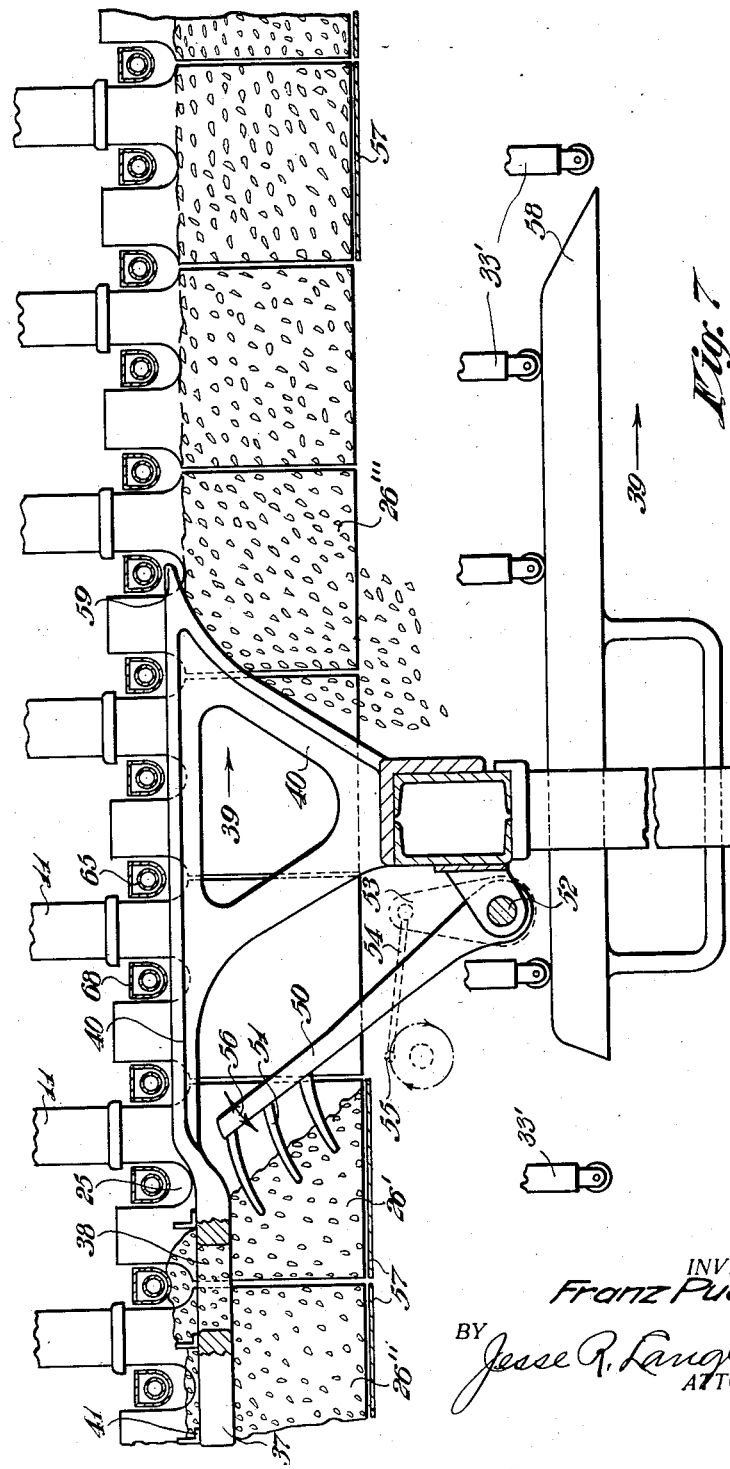
Fig. 7 is a radial view from the inside of a developed circular section along line G—H of Fig. 1.

The novel method of charging, covered by this invention, can be gathered from Figs. 1, 7 and 13 which shows that the coal is thrown into the coking spaces 26 from above. To accomplish this purpose, a throwing machine 21 is employed, which preferably is carried by the rotating inside shell 22. The throwing machine 21 has a charging throat 23 and a mouth-piece 24. This mouth-piece 24 has corresponding large radially aligned filling openings 25, which are arranged in an annular series in the suspended elements, as shown in Figs. 1, 4 and 13.

The openings 25 are situated below the beams 65 and the coal is thrown through these openings into the coking spaces $26_1$ to $26_6$, which latter are arranged in radial alinement. The outside wall of the last coking chamber $26_6$ must, however, be solid to prevent coal from reaching the outside, or special means must be employed to attain this end.

The throwing machine 21 with rotating arms 27 is a known device. The coal is fed through a feeder line 30 in direction of arrow 31, and a feeder valve is installed in this feeder line, which periodically cuts off the coal supply. A valve 32 can be used for this purpose. In accordance with Fig. 1, the latter consists of a housing $32_1$, through which the coal stream enters, and in which a star wheel is rotatably arranged, which is being kept in rotation over a period of time through which coal must be fed by a suitable drive (not shown) such as an electric motor.

The mouth-piece 24 is kept at a certain distance from the innermost wall and below the mouth-piece there is arranged a hopper or funnel 34, which catches the surplus coal. From this funnel the coal is led to a bucket elevator 35, which carries the coal back to the feeder line 31. In the illustrated example of such a device, the discharge chute 36 of the elevator empties in the feeder line 31 above the star valve 32.

The mouth-piece 24 is not always opposite one of the filling openings 25 and for this reason the star valve 32 is provided to cut off the flow of coal to the throwing machine 21, as soon as the mouth-piece 24 gradually leaves the range of the filling opening 25 and faces the region of the solid wall between two filling openings 25.

The star wheel 33 of the coal valve 32 is driven by an electric motor (not shown) which is set in motion at regular intervals by means of a suitable controlling device, when the mouth-piece 24 is in reach of the filling opening 25. As soon as it leaves this reach, the motor is stopped.

The entire coal-charging device has such a capacity that within the alotted time all coking chambers $26_1$ to $26_6$ are filled completely to the top with coal, and in addition a certain excess amount will be fed which eventually will be carried off by the bucket elevator 35, as has been mentioned before.

The amount of coal in the coking chambers in excess of the required quantity is removed by means of the displacement or limiting bars 37. Such a limiting bar is being shown in Figs. 1, 7, 11 and 13. It has considerable thickness, and for this reason it can displace a proportional amount of coal. An opening 38 extends through it.

The limiting bar 37 moves in the direction of the arrow 39 and is rigidly connected to a member 40 for actuation, as will be described later. When charging the coal, the latter moves through the duct formed by the filling openings 25 and falls through the openings 38 of the limiting bars 37 into the coking chambers. As the limiting bar 37 moves on, the coal falls into the space behind the bar, which space was just previously occupied by the bar and, by this arrangement, an excessive height of coal in the coking chambers is avoided.

The limiting bar 37 carries small scraper bars 41, reaching into the top part of the chamber for the purpose of moving coal which may have settled in this region, toward the front, i. e., in the direction of travel of the machine (see arrow 39). In this manner, a vacant space 66 above the coal is created in each coking chamber and into which space the distilling gases escape.

These gases flow from space 66 through the radial filling openings 25 and through chamber 67 into the gas line 70 and into a condenser connected therewith (not shown). To remove possible small accumulations of coal which may have settled in the lower part of the filling openings, a hand-operated scraper 42 is provided, as shown in Fig. 1. This scraper is mounted on the outside shell of the machine and at a convenient time will be pushed in the direction of the arrow 43 to the inside. Its scraper plate or head 44 pushes the accumulated coal into the space 38.

Fig. 2 shows an automatic arrangement for removing these accumulations of coal. It consists again of a scraper 42', fastened to a chain 45. This chain runs over two chain wheels 46 and 47, which are driven alternately in opposite direction and which are operated at such times as the scraper is just opposite a row of filling openings. The scraper is then quickly pushed forward by the chain drive and pulled back again. The chain drive 45 is put in operation from time to time by a motor (not shown) and this motor in turn is controlled by an automatic device, which connects or disconnects the motor and a source of current.

The scraping off or the pushing out of the accumulated coal should be done before gasification develops, i. e., shortly after the coal has been charged.

The last limiting bar 37 can be equipped with a guard 48, as has been indicated in Fig. 1, which prevents coal from being thrown beyond the last coking chamber $26_6$. This guard 48 may be a substitute for the closing plate 49, which has been indicated by dot-and-dash lines in Fig. 1. This closing plate 49 could, of course, not be employed in case the hand-operated scraper 42 should be preferred.

The last-mentioned scraper, however, could be used in addition to the automatic scraper $42_1$, because the hand-operated scraper can be shaped to a closer fit with the filling opening than the mechanical scraper $42_1$. It would be advantageous to insert the hand-operated scraper 42 from time to time in addition to using the automatic device.

In connection with the coal-charging device, there is also provided a tamping device, illustrated in Fig. 7, which would be employed in those cases where it is desirable to compress the coal somewhat, before it is being subjected to the coking process. In this way, it will be possible to produce a denser coke. This invention now provides a tamping device in each coking chamber, which rotates in each chamber with the other rotating parts. This device consists of a swinging arm 50, which carries at its free end a number of tamping fingers 51, and which is fastened to a shaft 52.

The swinging arm 50 receives an oscillating motion by means of a lever 53, also fastened to shaft 52 and a connecting rod 54, the latter being moved to and fro by a crank disc 55. The shaft 52 penetrates the inside rotating shell and the lever 53, the connecting rod 54 and the crank disc 55 being located in the open. The drive of the crank disc is effected by a motor rotating with the machine.

The operation of the tamping device can be gathered from Fig. 7.

The coking chamber 26' has just been filled partly with coal. The swinging arm 50 describes, with its free end, a swinging movement, as has been indicated by the double arrow 56. By so doing, the fingers are pushing into the angle of repose of the coal and thereby cause the coal to settle to a greater density than would be the case otherwise. The bottom doors 57, which close the coking chambers from below, are in closed position on chambers 26' and 26" (see Fig. 6).

The swinging arm 50 of the entire tamping device moves together with arm 40 and the limiting bar 37 in the direction of the arrow 39 ahead, and the whole device is being carried by a carriage, which also supports the steering rail 58, manipulating the bottom doors. The arm 40 at its upper forward end 59 is shaped into a plow-like knife, which is just removing the finished coke from chamber 26''', by forcing it out downwardly. The portions of the coking chambers lying between 26' and 26''' have already been emptied and the coke has fallen out or has been forced out.

I claim as my invention:

1. Coking apparatus comprising a plurality of annular concentric coking chambers having a vertical axis, a plate forming a gas-tight top closure for said coking chambers, and hollow heating walls between said coking chambers and suspended from said plate.

2. Coking apparatus comprising a series of annular concentric coking chambers having a vertical axis, hollow heating walls therebetween and having tubular portions for conducting heating gases through said walls and means for supporting said heating walls comprising a plate forming a closure for the tops of said coking chambers and to which said tubular portions are secured.

3. Coking apparatus comprising a series of spaced annular concentric coking chambers having a vertical axis, an annular plate forming a top closure for said chambers and having annular concentric and radially-extending folds therein for relative movements of portions of said plate.

4. Coking apparatus comprising a series of spaced coking chambers, contiguous metal heating walls therebetween and alternating therewith and having tubular portions constituting ducts for conveying gases into and from said heating walls, a metal cover plate for said coking chambers and said heating walls and having openings for said tubular portions, the latter having gas-tight connections to said plate.

5. Coking apparatus comprising a horizontal series of alternate coking chambers and heating walls contiguously arranged, means comprising two ducts for respectively supplying gases to and conveying gases from said heating walls, a plate forming a top closure for said coking chambers and constituting a wall for one of said ducts and means for communicably connecting each of said ducts to said heating walls through said plate.

6. Coking apparatus comprising a coking chamber and a plurality of horizontally contiguous hollow metal wall members constituting a heating wall therefor, means for suspending said wall members in horizontally spaced relation at their top portions, and means for maintaining the spaced relation of said members at their intermediate portions.

7. Coking apparatus comprising a coking chamber and a plurality of horizontally contiguous hollow metal wall members constituting a heating wall therefor, means for suspending said wall members in horizontally spaced relation at their top portions, and means for maintaining the alinement of said members at their bottom portions.

8. Coking apparatus comprising stationary endless annular concentric coking chambers, the axis of which is vertical; means for charging solid material into said coking chambers comprising openings in the upper part of the walls of each of said coking chambers, said openings being arranged in an annular series of rows coaxial with said coking chambers, the openings in each row being in alignment with each other and on a radius of said axis, means mounted for movement in an annular path coaxial with said coking chambers at the level thereof for supplying said coking chambers with coal through said openings, and means for conveying coal to the supplying means.

9. Coking apparatus comprising stationary endless annular concentric coking chambers, the axis of which is vertical, having an annular series of rows of top charging openings, the charging openings of each row being in radial alignment with respect to the axis of said chambers, coal-throwing apparatus mounted for movement in an annular path coaxial with respect to said coking chambers into and out of alignment with the rows of charging openings for throwing coal through the radially aligned openings into said coking chambers, and means for conveying coal to said throwing apparatus.

10. Coking apparatus comprising stationary endless annular concentric heating walls, the axis of which is vertical, spaced to provide endless annular concentric coking chambers therebetween, said coking chambers having an annular series of rows of stationary top charging openings, the charging openings of each row being in radial alignment with respect to the axis of said chambers, coal-throwing apparatus mounted for movement in an annular path co-axial with said coking chambers for supplying coal through the radially aligned openings to said coking chambers, coal conveying means for conveying coal to the coal-throwing apparatus, an apertured coal leveler bar in the upper part of each of said chambers, the apertures in said bars being adapted for communicating with their respective coking chambers and the rows of charging openings for controlling the feed of coal from the charging openings into the coking chambers, the bars for all of said chambers being mounted with their apertures in radial alignment with each other and with the coal outlet for the throwing apparatus, and all of the bars being mounted for movement in concentric paths co-axial with said coking chambers into and out of alignment with the radially aligned charging openings as a unit with the coal-throwing apparatus for limiting the height to which said coking chambers may be charged with coal through the charging openings by said coal-throwing apparatus.

FRANZ PUENING.